UNITED STATES PATENT OFFICE.

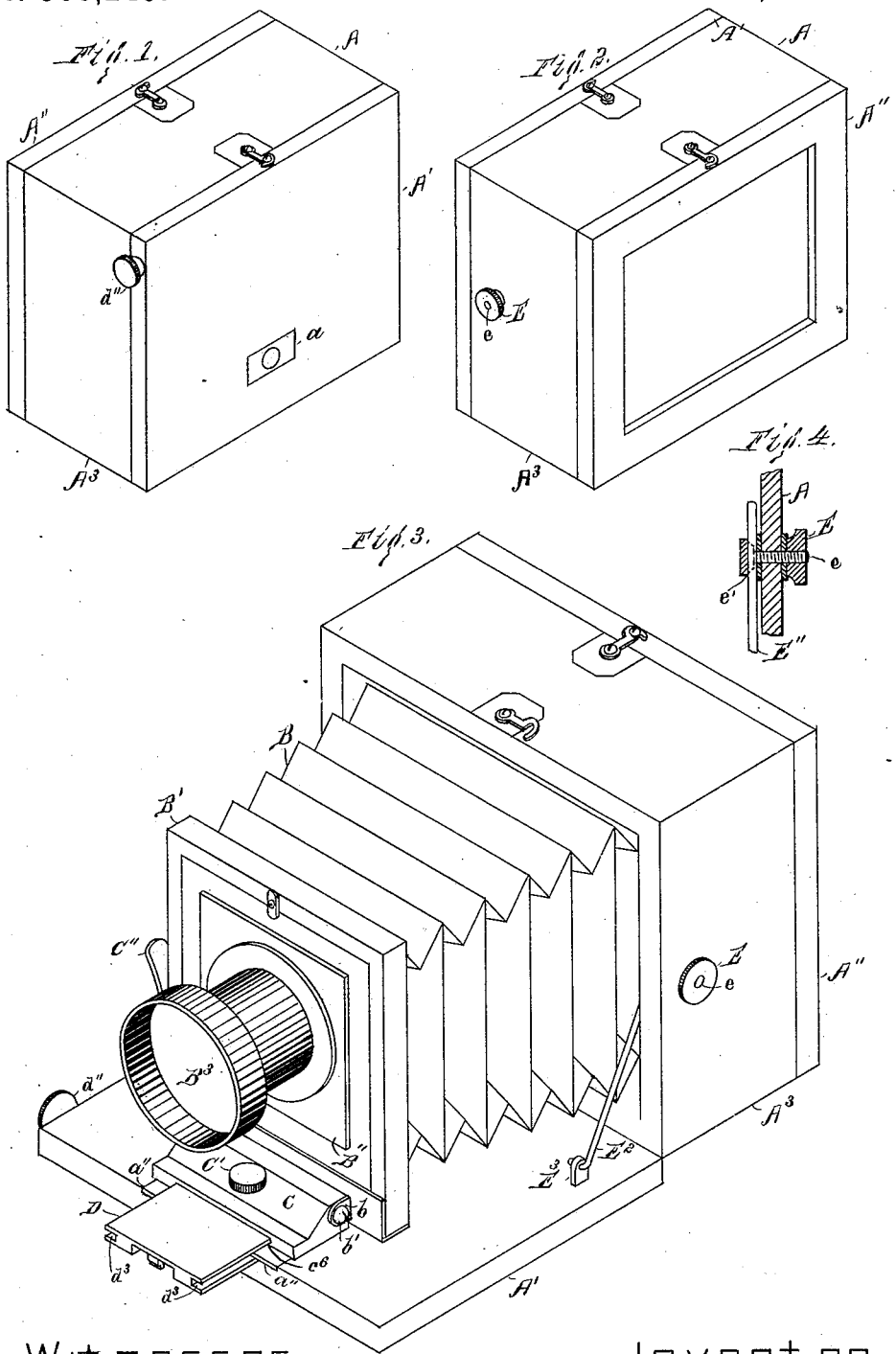

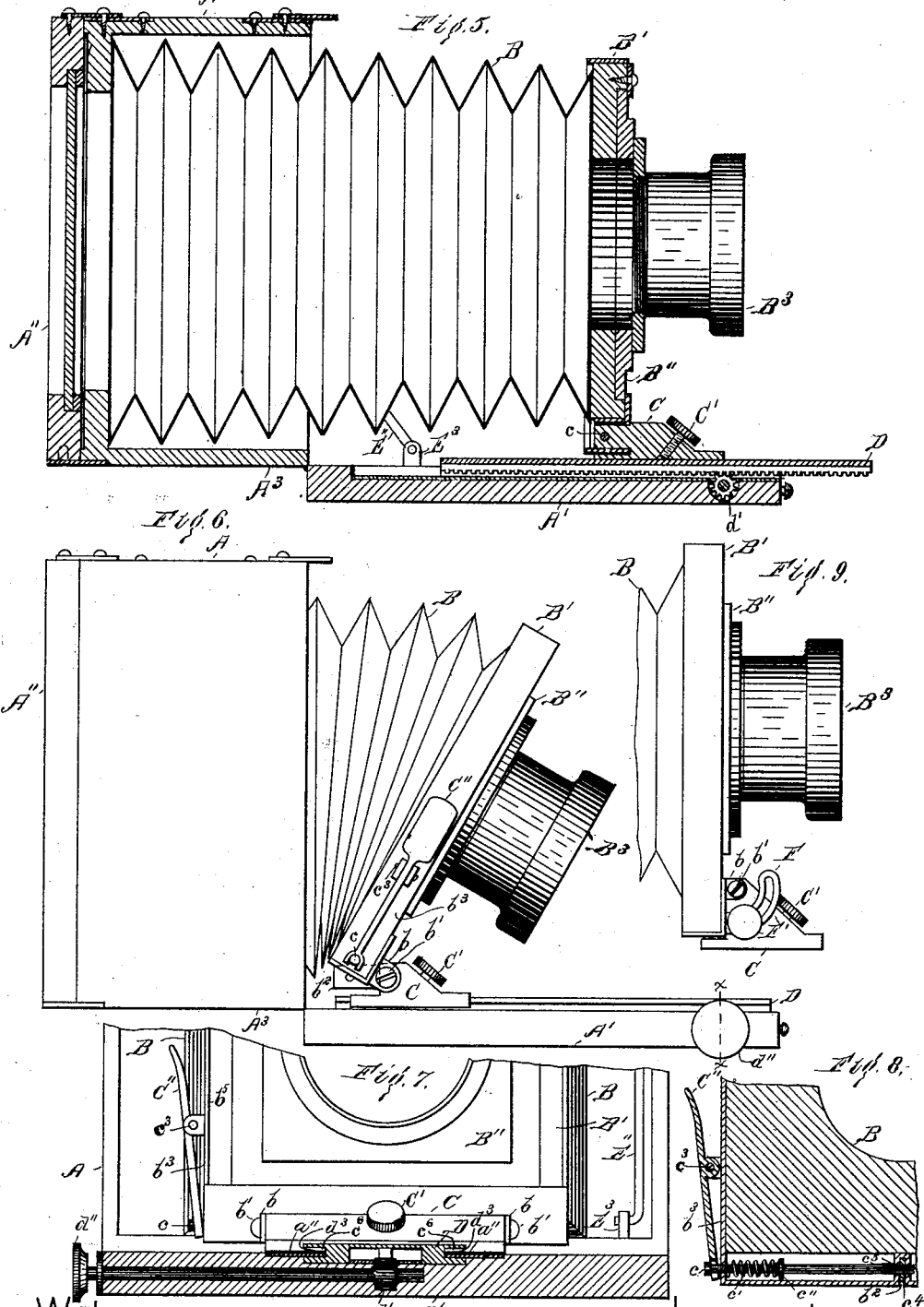

ALLAN CAMERON SARGENT, OF GRANITEVILLE, MASSACHUSETTS.

PHOTOGRAPHIC CAMERA.

SPECIFICATION forming part of Letters Patent No. 360,249, dated March 29, 1887.

Application filed July 19, 1886. Serial No. 208,414. (No model.)

*To all whom it may concern:*

Be it known that I, ALLAN CAMERON SARGENT, a citizen of the United States, residing at Graniteville, in the county of Middlesex and Commonwealth of Massachusetts, have invented a certain new and useful Improvement in Photographic Cameras, of which the following is a specification.

My invention relates to an improvement in photographic cameras; and it consists in the device hereinafter described, whereby the camera may be closed or folded into a compact rectangular-shaped box so as to be easily transported, and when opened allows a long expansion of the bellows and a consequently long focal range.

In the accompanying drawings, Figure 1 is an isometric view of my improved camera closed, as when being transported from place to place; Fig. 2, an isometric view showing the front or ground-glass side; Fig. 3, an isometric view of the camera open and with the bellows expanded ready for operation; Fig. 4, a central section through the thumb-nut E, (which regulates the position of the swing-back,) showing a small section of the side of the camera and the rod connecting it with the back or base; Fig. 5, a sectional elevation of the camera when open, as shown in Fig. 3; Fig. 6, an elevation of the camera with the bellows compressed and the movable front tilted into position ready for folding; Fig. 7, a vertical central elevation on the line $x\ x$ in Fig. 6, showing the slide, rack, and pinion, the projecting knob for operating pinion, and the lower part of the front end of the camera; Fig. 8, a sectional elevation of one of the lower corners of the movable front of the camera, showing the manner of securing the movable front in either a perpendicular or tilted position; Fig. 9, an elevation of the movable front and the slide, showing another form of the device for retaining the movable front in the desired position.

In the drawings, A refers to the case or box, within which the bellows, lens, and mechanism for adjusting the focus are contained. The back of this box, A'', consists of the ordinary ground-glass screen, which is replaced by the slide containing a sensitive plate, upon which the image is photographed, and is constructed in the usual well-known manner. The opposite side of the box, A', is hinged to the lower side, A³, of the box, and is provided with a plate, $a$, having a screw-threaded hole, within which turns a suitably-threaded screw secured to the tripod or standard. This side A', which when opened, as shown in Figs. 3, 5, 6, and 7, forms the base, is retained at the desired angle with the swing-back (or part to which the bellows is attached, and which holds the ground-glass plate or the slide) by means of the rod E'', which has its lower end bent to about a right angle, and is inserted in a hole in the stud E³, which is secured to the base A'. The screw $e$ has an enlarged head on its inner end, and is provided with a longitudinal slot, $e'$, through which passes the upper end of the rod E'', the outer end being screw-threaded and passing through the side of the case and engaging with a thumb-nut, E.

When the base and the ground glass A'' are at the proper angle with each other—that is to say, when the image thrown by the lens upon the ground glass is in the desired position—the thumb-nut E is turned so as to draw the enlarged head $e^3$ toward the side of the case and press upon the rod E'', causing sufficient friction to prevent its movement, thus holding the case or swing-back, as it now becomes, and the base firmly at the required angle with each other.

It will be seen that when the thumb-nut E is loosened, the swing-back may be tilted so as to stand at any angle with the base, thus bringing the image thrown through the lens in any desired position on the glass. The movable front piece, B', is provided with ears $b\ b$ at both ends of the slide C, through which pass screws $b''\ b''$, which enter the slide C, thereby hinging the slide and the movable front together.

On one side of the movable front B' is placed a lever, C'', pivoted at $c^3$ to the metallic strip $b^3$, surrounding the movable front, and having its lower end forked to engage with a pin, $c$. The pin $c$, having an enlarged head for the purpose of retaining the fork of the lever, is provided with a spring, $c'$, which is compressed between a collar, $c''$, secured to the pin and the strip $b^3$. At a point midway on the lower side of the movable front there is a U-shaped recess, $b^2$, through which the pin $c$ passes, and which receives the projection $c^4$ on the slide C when the movable front is in a perpendicular position. This projection $c^4$ is provided with a hole, $c^5$, through which the pin $c$ passes, thus securing the movable front firmly in a perpendicular position, as shown in Figs. 3 and 5.

When the upper end of the lever C'' is pressed toward the side of the movable front, it draws the pin $c$ out of the hole in the projection $c^4$, and the front is then free to be tilted forward, as shown in Fig. 6. The lens may be pushed inward, so that the front shall be about flush with the movable front, and the thumb-nut E being loosened, the rod E'' will move freely through the slot in the screw $e$, and the base A' may be turned up against the open end of the case or swing-back, as shown in Fig. 1.

The rack D, which is movable on the base A', between ways $a''$ $a''$, is operated by the pinion $d'$ and projecting knob $d''$ in the usual manner. The rack D is provided with longitudinal grooves $d^3$ $d^3$, and the slide C is provided with lips $c^6$, which enter the grooves $d^3$ $d^3$, so the slide may be moved to and fro on the rack. The slide C is provided with a screw, C', turning in a screw-threaded hole in the slide, and adapted to press upon the upper surface of the rack D when it is turned down, and thus retain the slide in the required position on the rack.

For transportation from place to place the camera is closed, as shown in Figs. 1 and 2, forming a rectangular box. When it is desired to operate, the side or base B' is secured to the standard by means of a screw entering the hole in the plate $a$. The hook $h$ being unfastened the swing-back or case, to which one end of the bellows is attached, is raised until it stands at the required angle with the base, and is there secured by tightening the thumb-nut E. The upper end of the lever C'', being pressed inward, releases the movable front, so that it may be raised to a perpendicular position and there secured upon releasing the lever by the pin $c$ passing through the hole $c^5$. The lens having been placed in the proper position, the screw C' is loosened and the slide C drawn out on the rack until it reaches the end or till about the proper position is found to throw the image clearly upon the ground glass, the exact focus being obtained by moving the rack to and fro by means of the pinion and thumb-nut in the usual manner after the slide is secured in position on the rack by tightening the screw C'. It will be seen that by having the movable front secured to the slide moving on the rack, an expansion of the bellows may be obtained which is twice as great as would be possible were the movable front secured directly to the rack.

When it is desired to close the camera, the slide C is pushed back to the position shown in Fig. 6, and secured by tightening the screw C', and the motions above described reversed.

The device shown in Fig. 9 is another means of securing the movable front in position. A slotted arc, F, is secured to the front of the movable front, B', at the end of the slide C, and through the slot in this arc passes a thumb-screw, F', which turns in a screw-threaded hole in the slide. When the movable front is in the desired position, the thumb-screw is turned up until the head presses upon the arc with sufficient force to retain it in place, thus securing the movable front in position.

It will be evident that the ends of the camera might be reversed—that is, the ground-glass side might be made the movable part, instead of the part B'—and also that various other well-known devices could be used to regulate and secure the angle of the swing-back with the base; but I prefer to construct the device substantially as shown and described.

I claim as my invention—

1. A photographic camera contained within a rectangular case, one side of said case being adapted to be turned down into a horizontal position to form the base, ways secured to said base, a rack adapted to be moved to and fro on said base between said ways, and a slide adjustably secured to the front piece of said camera and adapted to be moved to and fro on said rack, substantially as described.

2. A photographic camera contained within a rectangular case, one side of said case being adapted to be turned down into a horizontal position to form the base, ways secured to said base, a rack adapted to be moved to and fro on said base between said ways, and a slide adjustably secured to the front piece of said camera, to which one end of the bellows is attached, and adapted to be moved to and fro on said rack, the outer end of the bellows being secured within the case which forms the swing-back, said swing-back being hinged to the base so that it may be adjusted to any required angle with the base, substantially as shown and described.

3. In a photographic camera, a rack adapted to be moved to and fro by means of a pinion and thumb-nut, a slide adapted to move lengthwise upon said rack, said slide being adjustably secured to the movable front of the camera, as and for the purpose specified.

4. In a photographic camera, the combination of a case having one side thereof adapted to be turned down to form a base to which the swing-back is adjustably secured, a rack, a pinion, and thumb-nut for operating said rack, and a slide attached to the movable front of the camera and adapted to move to and fro upon said rack, substantially as described.

ALLAN CAMERON SARGENT.

Witnesses:
HENRY W. CHURCH,
FREDERICK G. SARGENT.